United States Patent [19]

Richter

[11] 4,331,742

[45] May 25, 1982

[54] SOLID ELECTROLYTE CELL

[76] Inventor: Alan M. Lovelace, Administrator of the National Aeronautics and Space Administration, with respect to an invention of Robert Richter, La Canada, Calif.

[21] Appl. No.: 220,214

[22] Filed: Dec. 24, 1980

[51] Int. Cl.³ .............................................. H01M 8/10
[52] U.S. Cl. ....................................... 429/33; 429/40; 429/193; 204/290 R; 204/290 F
[58] Field of Search ............ 204/290 F, 290 R, 195 S; 429/40, 41, 44, 30, 191, 31, 33, 46, 193

[56] References Cited

U.S. PATENT DOCUMENTS

| | | | |
|---|---|---|---|
| 3,115,702 | 12/1963 | Scutt et al. | 204/290 F |
| 3,410,784 | 6/1965 | Maunsell et al. | 204/290 R |
| 3,460,991 | 8/1969 | White, Jr. | 429/40 X |
| 3,632,498 | 1/1972 | Beer | 204/290 F |
| 3,711,385 | 1/1973 | Beer | 204/290 F |
| 3,751,296 | 8/1973 | Beer | 204/290 F |
| 3,840,443 | 10/1974 | Beer | 204/290 F |
| 3,864,163 | 2/1975 | Beer | 204/290 F |
| 4,031,291 | 6/1977 | Fullenwider | 429/40 |
| 4,178,418 | 12/1979 | Croset et al. | 429/33 |

Primary Examiner—Anthony Skapars
Attorney, Agent, or Firm—Thomas H. Jones; John R. Manning

[57] ABSTRACT

A solid electrolyte cell including a body of solid ionized gas-conductive electrolyte 20 having mutually spaced surfaces 30 and 32 on which is deposited a multiplicity of mutually spaced electrodes 34 and 36, having strips 30 and 32 of bare substances interposed between electrodes, so that currents of ionic gas may be established between the electrodes via the bare strips 30 and 32, whereby electrical resistance for the cells is lowered and the gas conductivity thereof is enhanced.

1 Claim, 3 Drawing Figures

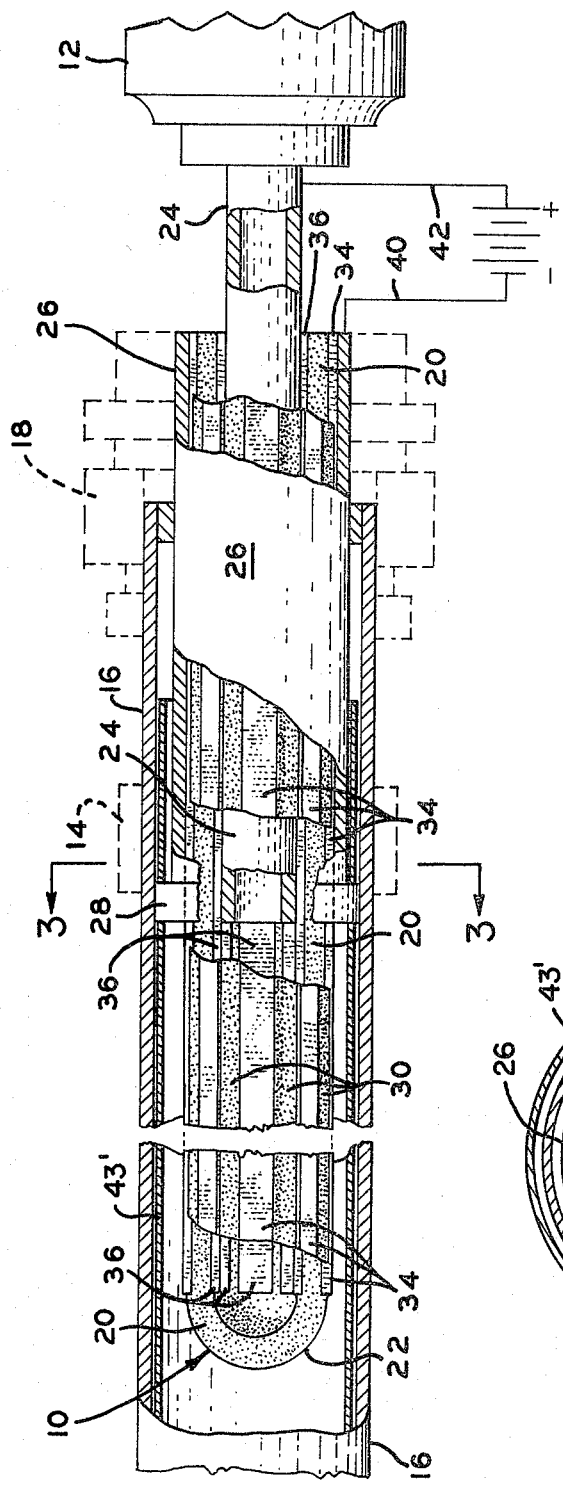
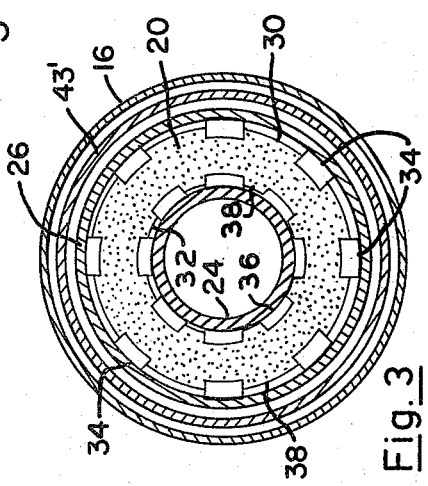
Fig. 2
Fig. 3

SOLID ELECTROLYTE CELL

ORIGIN OF THE INVENTION

The invention described herein was made in the performance of work under a NASA Contract and is subject to the provisions of Section 305 of the National Aeronautics and Space Act of 1958, Public Law 85-568 (72 STAT. 435; 42 U.S.C. 2457).

BACKGROUND OF THE INVENTION

The invention generally relates to solid electrolyte cells and more particularly to an improved solid electrolyte cell having strips of platinum defining electrodes extended along opposite side surfaces of the cell in mutually spaced parallelism and defining therebetween parallel strips of bare substrate surfaces which tend to offer minimal resistance to gas flow, whereby the electrical resistance for the cell is lowered and the gas conductivity thereof enhanced.

DESCRIPTION OF THE PRIOR ART

Use of solid electrolyte cells generally is well known in the separation of oxygen from compounds such as carbon dioxide, and the disassociation of water into oxygen and hydrogen, as well as in fuel cells for production of electricity from a recombination of oxygen and hydrogen.

As is also well known, the operation of a solid electrolyte cell is based on its capabilities for conducting ions when either an electrical potential is applied thereacross, or a difference of partial pressures of oxygen is caused to exist at the two sides of the solid electrolyte. In either case, it is necessary that the opposite surfaces of the solid electrolyte be electrically connected so that an ionic current can be established between the opposite side surfaces, through the body of solid electrolyte.

The ionic current is, of course, made up of oxygen ions which enter the solid electrolyte at the interface of the so-called negative surface and exit at the interface of the so-called positive surface, as determined by the polarity of the applied voltage.

The amount of ionic current that can be caused to flow through a solid electrolyte with a given total voltage drop is a function of the resistance of the electrodes attached to or plated on the opposite surfaces of the body of electrolyte. Electrodes for solid electrolyte cells of the type aforementioned, conventionally have been made of platinum deposited on the surfaces of the body of solid electrolyte as a film and then fired. Heretofore, it has been required that the film be porous sufficiently as to be gas conductive. To insure an existence of the required porosity, the film generally must be applied as a relatively thin film. Unfortunately, the electrical resistance of the electrodes thus is increased. Conversely, where attempts have been made to increase the mass of electrodes, for thereby reducing electrical resistivity, increased resistance to gas flow at the surface interfaces is encountered. Hence, those engaged in the design of electrolyte cells have for a long while been plagued with the attendant design problems arising from these competing design parameters. It is therefore, the general purpose of the instant invention to provide an improved solid electrolyte cell, having enhanced electrical conductivity without an attendant increase in gas-flow resistance.

During the course of a search conducted for the instant invention, the patents discovered are listed on the enclosed "List Of Prior Art Cited By Applicant".

Of the patents listed on the enclosed sheet, it is believed that U.S. Pat. No. 3,115,702 to Scutt probably is the most pertinent reference discovered during the course of the search, aforementioned. This patent discloses an electrolytic process in which water is split into hydrogen and oxygen. Based upon the realization that the electrode in the process does not have to be made entirely of platinum, but that the platinum has to cover only a fraction of the total electrode surface, the patentee suggests the use of a composite electrode consisting of a refractory base metal, such as titanium, niobium or zirconium and an inlaid noble metal such as platinum or a platinum based alloy in which the noble metal was added for cathodic protection of the anode. It is important to note that the platinum is not utilized in forming the electrode but has been added to the base metal electrode for protection. Moreover, the size and configuration of the platinum strips has no effect on electrolytic operation of the cell and no gasses have to cross a solid barrier at the interface. In other words, the teachings of this patent suggest a lowering of the total usage of noble metal cladding by leaving bare base metal surfaces exposed without an attendant deterioration of the base metal.

OBJECTS AND SUMMARY OF THE INVENTION

It is an object of the instant invention to provide an improved solid electrolyte cell.

It is another object to provide an improved solid electrolyte cell having platinum electrodes deposited on opposite side surfaces of a solid electrolyte body in a manner such that enhanced electrical conductivity is facilitated without an attendant reduction in the cell's capability of accommodating gaseous currents of ions through the body.

It is another object to provide in a solid electrolyte cell, a body of electrolyte material having opposed surfaces, each defining a substrate for a plurality of electrodes, said body being characterized by paths for ionic currents extended between the opposed surfaces of the body, a multiplicity of elongated, mutually spaced electrodes deposited on each of said surfaces and having defined therebetween elongated strips of substrate surfaces exposed to the ambient environment for the cell, whereby an increased electrical flow is accommodated without an increased resistance to ionic currents flowing between the electrodes at the opposite surfaces of the body.

These and other objects and advantages are achieved by depositing on the opposite surfaces of a body of electrolyte material a plurality of mutually spaced bar-shaped electrodes arranged in parallelism for defining therebetween strips of substrate exposed to the ambient environment for the cell.

DESCRIPTION OF THE DRAWINGS

FIG. 2 is a partially sectioned, fragmented view, but on an enlarged scale, of the cell shown in FIG. 1.

FIG. 3 is a cross-sectional view of the cell taken generally along lines 3—3 of FIG. 2.

DESCRIPTION OF THE PREFERRED EMBODIMENT

Figure 1:
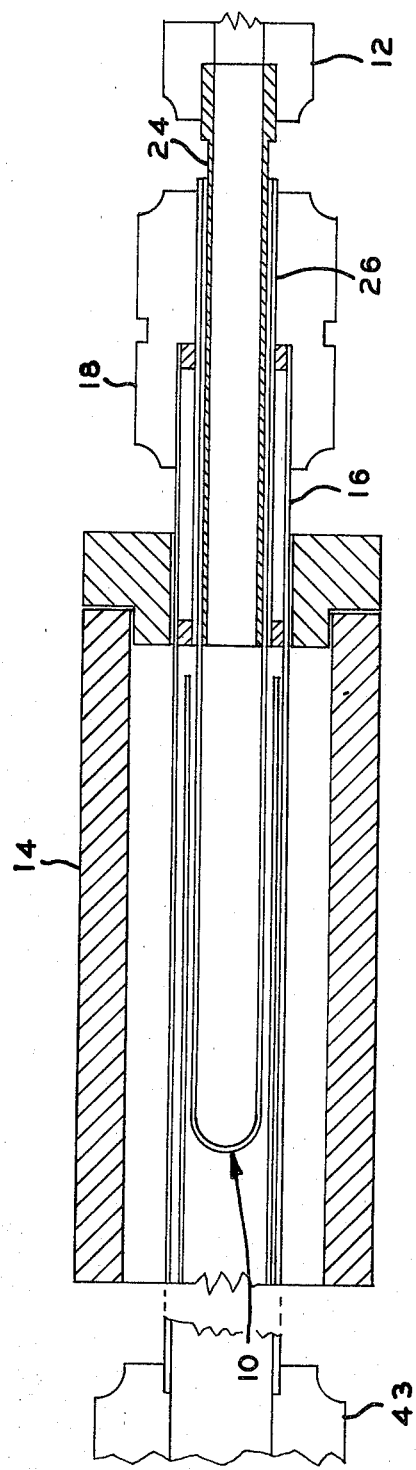
FIG. 1 is a partially sectioned, schematic view of a solid electrolyte cell, seated in a heater utilized for stabilizing the temperature of the cell.

Referring now to the drawings, with more particularity, wherein like reference characters designate like or corresponding parts throughout the several views, there is shown in FIG. 1, an electrolyte cell, generally designated 10, embodying the principles of the instant invention.

It is here important to appreciate that the invention relates primarily to the construction of electrodes for the cell 10 and that the cell 10 is equally useful in processes in which a separation of oxygen from carbon dioxide, and in the disassociation of water into oxygen and hydrogen, or, for that matter, in a fuel cell for producing electricity through a recombination of oxygen and hydrogen. Therefore, the purpose, particular environment, and/or the particular process in which the solid electrolyte cell 10 of the instant invention is employed forms no particular part of the invention hereinafter more specifically described and claimed.

As shown in the drawings, however, the solid electrolyte cell 10 is formed of an ionized gas-conductive material of a tubular configuration, having one end closed and connected at its opposite end through a suitable fitting 12 to an oxygen-gas receiver, also not shown. Furthermore, as shown, the cell 10 is seated in a clam-shell heater 14, the purpose of which is to control the temperature of the cell. Again, since the particular environment in which the cell 10 is employed is of no particular consequence, a detailed description of the heater 14 is omitted in the interest of brevity.

It therefore suffices to say that the cell 10, as shown, is connected to communicate with a source of oxygen-bearing gas, such as $CO_2$, through the fitting 43 and is seated in a conduit 43' mated with a sleeve 16, provided for coupling purposes. It is to be understood that the conduit is suitable for conducting $CO_2$ to the external surface of the cell 10 and is connected in an hermetically sealed relation therewith. A suitable union 18, also forming no part of the invention hereinafter described and claimed, is provided for connecting the sleeve 16 with the fitting 12.

Referring now for a moment to FIG. 2, it can be seen that the electrolyte cell 10 comprises a body 20 of solid electrolyte having an elongated tubular configuration closed at its end, designated 22. The opposite end of the body 20 is connected in communication with the fitting 12 through a length of tubing 24, formed of a material such as Inconel 600, extended through this union 18 and inserted axially into the body 20. The body 20 is inserted into a length of tubing 26, also formed of Inconel 600, which is in turn hermetically sealed, through the use of hermetic seals 28, within the sleeve 16.

As shown in the drawings, the body 20 includes an external surface 30 and an internal surface 32, both being of a cylindrical configuration and arranged in mutually concentric relation. The material from which the body 20 is formed comprises a ceramic ionized gas-conducting material, such as, for example, eight percent yttria stabilized zirconia, the purpose of which is to accommodate an establishment of a plurality of flow paths for ionic currents extending between the surfaces 30 and 32.

Deposited on the external surface 30 of the body 20 is a plurality of mutually spaced electrodes 34, of bar-like configurations. These electrodes are arranged in parallelism with the longitudinal axis of the body 20, and are commonly connected through contact with the length of tubing 26. As a practical matter, the tubing 26 functions as a common contact or bus bar for the electrodes 34.

Deposited on the internal surface 32 of the body 20, is a plurality of mutually spaced, bar-like electrodes 36. The electrodes resemble the electrodes 34 in size and shape and extend in parallelism with the longitudinal axis of the body 20. As a practical matter, the electrodes 34, as well as the electrodes 36, define therebetween bare strips 38 of substrate surfaces, whereby the body 20 is exposed at its opposite surfaces to ambient environments, both internally and externally.

The particular manner in which the electrodes 34 and 36 are deposited on the surface of the body 20 also forms no part of the instant invention. It suffices to say that the number of bare strips 38 of substrate, or body surface, for the electrodes 34 and 36, and the width thereof is determined by manufacturing limitations. However, the optimum effect is achieved by having the largest numbers of electrodes found possible, under practical constraints, with the smallest widths found possible. Thus, both the electrodes 34 and 36 are arranged to conduct a flow of electron current in parallelism with the longitudinal axis of the body.

As aforementioned, the electrodes 34 are commonly connected with the tubing 26. The electrodes 36, however, are commonly connected with the length of tubing 24. Since the lengths of tubing 24 and 26 are formed of electrical conducting material, such as Inconel 600, these lengths of tubing not only afford structural strength but additionally serve as bus bars for the electrodes extended along the surfaces of the body 20.

In order to establish an electric field across the cross-sections of the body 20, a first lead 40 is connected, by welding, or the like, to the length of tubing 26, while a further lead 42 is connected to the length of tubing 24, also as by welding or the like. The leads 40 and 42 are, preferably, connected to the opposite sides of a voltage source in order to establish an electrostatic field across the electrolyte forming the body 20.

OPERATION

It is believed that in view of the foregoing description, the operation of the device will readily be understood, however it will be briefly reviewed at this point.

With the solid electrolyte cell embodying the principles of the instant invention assembled in the manner hereinbefore described, it is a simple matter to initiate its operation. When connected with a source of gas, such as $CO_2$, through the fitting 43, the $CO_2$ gas is introduced to flow along the exterior surface of the body 20, via the length of tubing 16. With an electrostatic field established across the body of solid electrolyte, the $CO_2$ is exposed to the bare strips 30 of substrate surfaces, as found to exist between the electrodes 34. These electrodes, as a practical matter, function as cathodes. Thus oxygen crosses the solid barrier at the interface of ambient environment, causing an ionic flow of oxygen to be established along a plurality of paths extending from the electrodes 34 to the electrodes 36. The electrodes 36, of course, function as anodes. Consequently, the $CO_2$ is broken down as the oxygen ions flow through the body 20 to the internal surface or bare strips 38 existing between the electrodes 36. At this surface, the ions recombine to form $O_2$ which is, where so desired, conducted away from the solid electrolyte cell 10 via the conduit, connected with the sleeve 24.

In view of the foregoing, it is believed to be readily apparent that the solid electrolyte cell which embodies the principles of the instant invention provides a practical solution to the problems heretofore encountered in attempting to enhance electron flow without an attendant reduction in ionic flow through a solid electrolyte body.

What is claimed is:

1. A solid electrolyte cell characterized by a reduced electrical resistance and an enhanced ionic gas conductivity comprising:

A. a tubular body, having a closed end and an open end and formed of an ionized gas conductive material comprising eight percent (8%) yttria stabilized zirconia, said body being characterized by a pair of mutually spaced inner and outer surfaces, whereby a current of migrating ions in a gaseous state may be established therebetween;

B. a first plurality of mutually spaced, bar-shaped electrodes formed from a noble metal deposited on and extended along the outer surface of said body in parallelism with the axis thereof and having defined therebetween strips of the outer surface of said body, and a second plurality of mutually spaced bar-shaped electrodes deposited on and extended along the inner surface of said body in registry with said first plurality, whereby the strips of the inner and outer surfaces of said tubular body are caused to be exposed in registry between the electrodes deposited on said surfaces;

C. means supporting said tubular body in received concentric relation with a conduit for $CO_2$, whereby the strips of the outer surface of the body are contacted by $CO_2$ as $CO_2$ is caused to fill said conduit;

D. a fluid extraction conduit comprising an electrical conductor inserted into said body, at the open end thereof, electrically contacting each of the bar-shaped electrodes of said second plurality of electrodes;

E. a tubular conductor circumscribing said body near the open end thereof and electrically contacting each of the bar-shaped electrodes of said first plurality forming a common electrical connector therefor; and F. electrical circuit means connected with said fluid extraction conduit and said tubular conductor for establishing an electrical potential between the first and second pluralities of electrodes.

* * * * *